United States Patent Office 3,408,308
Patented Oct. 29, 1968

3,408,308
SELF-EMULSIFYING LIQUID ANTIOXIDANTS
Raymond R. Waterman, Easton, Conn., and John Bogdany, Dumont, N.J., assignors to R. T. Vanderbilt Company, Inc., New York, N.Y., a corporation of New York
No Drawing. Continuation-in-part of application Ser. No. 133,320, Aug. 23, 1961. This application May 19, 1966, Ser. No. 551,201
22 Claims. (Cl. 252—401)

ABSTRACT OF THE DISCLOSURE

This application discloses a stable emulsion concentrate comprising a continuous phase of a major amount of a water-immiscible liquid antioxidant for latex rubber, a relatively small amount of water as a discontinuous phase, and as an emulsifier a small amount of a fatty acid water-soluble soap. This concentrate when added to water forms an oil in water emulsion with the antioxidant as the discontinuous phase which is then used in the processing of latex rubber. The application also discloses a method for making such concentrates by forming a mix B containing water and a fatty acid, forming a mix A containing a base capable of forming water-soluble soaps with said fatty acid and also a relatively large amount of a water-immiscible liquid antioxidant for latex rubber, and then adding mix B to mix A with high speed stirring.

The present invention pertains to emulsion concentrates and to a process for producing the same, and more particularly to a process of preparing a stable water-in-oil emulsion concentrate of a water immiscible liquid antioxidant for latex rubber, which concentrate is capable of self-emulsification upon dilution with water and inversion to form a stable oil-in-water emulsion, and to the emulsion concentrate so produced.

This application is a continuation-in-part of our copending application Ser. No. 133,320 filed Aug. 23, 1961, now abandoned.

Many antioxidants for latex rubber are water-immiscible liquids and hence must be emulsified prior to their use in latex rubber compounding. At the present time such water-immiscible liquid antioxidants must be emulsified by the rubber compounder. This is a considerable disadvantage to the rubber compounder, because he must maintain a stock of chemicals suitable for use in producing the aqueous emulsions, he must be careful in formulating the emulsions in order that they will be stable, he must expend heat energy to reduce viscosity in order to produce stable aqueous emulsions and he must consume a considerable amount of valuable time in emulsifying the water-immiscible liquid antioxidants before they can be used in latex rubber compounding.

If the producer of the water-immiscible liquid antioxidants supplies them to a rubber compounder in stable aqueous emulsion form ready for use, then the rubber compounder is unduly burdened with high shipping, handling and storage costs brought on by the high water content of the aqueous emulsions. This is commercially impractical.

The objects of the present invention, therefore, are to provide water-immiscible liquid antioxidants for latex rubber in emulsion concentrate form; which emulsion concentrates can be marketed at 90–95% active content, are remarkably stable, are self-emulsifying and can be readily diluted with water without the expenditure of heat energy to form stable aqueous emulsions for latex rubber compounding, do not contain diluents, and can be prepared and subsequently diluted to aqueous emulsions without the necessity for using expensive high shear mixers.

These objects of the invention are achieved provided certain criticalities are carefully observed. Thus the nature of the components used in preparing the emulsion concentrates is critical. It was found that the emulsifying agent in the emulsion concentrate may be water-soluble metalilc or amine salts of fatty acids having from 14 to 18 carbon atoms, i.e., soaps, including the potassium, sodium, ammonium, triethanolamine and dimethylamine salts of oleic acid, stearic acid, linolenic acid, linoleic acid, ricinoleic acid, palmitic acid, tall oil (a fatty acid resinous by-product of the manufacture of alkaline paper pulp and containing a natural mixture of acids related to abietic acid and oleic acid) and Neofat 42–12 (a commercial fractionated tall oil comprising oleic acid 46%, linoleic acid 39%, linolenic acid 3% and rosin acid 12%). It was not possible to obtain stable emulsion concentrates or emulsion concentrates which are compatible with latex rubber using other emulsifying agents, such as the synthetic organic emulsifying agents known as Toximul 250 and 300 (anionic-nonionic emulsifier blends), Neutronyx 600 (a nonionic emulsifier comprising an alkylphenol polyglycol ether containing 9.5 moles of ethylene oxide), Triton 177 (a blend of alkyl polyether alcohol with a modified phthalic glycerol alkyl resin), and Igepal CO 630 (nonionic nonylphenoxypolyethyleneoxyethanol). It is preferred to form the soap in situ in order to maintain the desired active (antioxidant) content of 90–95%. Another criticality is the order of the addition to one another of the two mixes used in forming the emulsion concentrate. A further criticality is the concentration of the materials comprising the emulsion concentrate. Also the original situs of the components in the two mixes used to form the emulsion concentrate is critical.

The water-immiscible liquid antioxidants for latex rubber utilized in the present invention are well known materials. Suitable antioxidant types include the phenols, amines and amine-acetone reaction products having a Brookfield viscosity at 25° C.–40° C. (30–60 r.p.m., No. 4 spindle) up to about 10,000 centipoises. Examples of such conventional antioxidants are (1) a mixture of mono-, di-, and tri-styrenated phenols sold under the trade name "Agerite Spar" (viscosity of 2400 cps.), (2) a mixture of polybutylated "Bisphenol A" (p,p'-isopropylidenediphenol) sold under the trade name "Agerite Superlite" (viscosity of 8300 cps.), (3) a mixture of octylated diphenylamines sold under the trade name "Agerlite Stalite" (viscosity of 8200 cps.), (4) a modified alkylated phenol sold under the trade name "Cyanox LF" (viscosity of 5100 cps.), (5) a hindered phenol sold under the trade name "Wing Stay T" (viscosity of 1175 cps.), (6) a mixture containing tristyrenated phenol sold under the trade name "Styphen I" (viscosity of 4050 cps.), (7) an alkylated bisphenol sold under the trade name "Naugawhite" (viscosity of 3125 cps.), (8) a thio-bis(di-sec.-amyl-phenol) sold under the trade name "Santowhite L"

(viscosity of 5140 cps.), (9) an alkylated diphenyl amine sold under the trade name "Pennox A" (viscosity of 3575 cps.), and (10) a diphenylamine-acetone reaction product sold under the trade name "Agerite Superflex" (viscosity of 4960 cps.).

In the process of the present invention a Mix A is formed by blending together an approximate stoichiometric amount, i.e., 0.9 to 1.4 of a stoichiometric amount based on the fatty acid used in Mix B, of a soap-forming base, e.g., sodium, potassium or ammonium hydroxide, triethanolamine, and dimethylamine, said base preferably being present as a 50% aqueous solution in an amount from about 3.2 to about 0.4 parts by weight of said solution, and from about 90 to about 95 parts by weight of the water-immiscible liquid antioxidant. A Mix B is also formed by blending together from about 0 to about 3.6 parts by weight of water and from about 6.8 to about 1 part by weight of fatty acid having from 14 to 18 carbon atoms. Mix B is then added to Mix A, generally at room temperature (about 25° C.), with high speed stirring, i.e., using a mixer having a maximum propeller speed of 1,800–2,000 r.p.m. The resulting product is a stable water-in-oil emulsion concentrate containing 90–95% active material (antioxidant) and is capable of self-emulsification upon dilution with water and inversion to form a stable oil-in-water emulsion.

It will be understood from the foregoing that when a 90% active material is desired (90 parts of antioxidant) and the minimum amount of faty acid (e.g. 1 part of oleic acid) is used, this will require about 0.2 part of KOH (generally added as a 50% aqueous solution) to react with the oleic acid to produce the soap. The original water present (calculated by difference, total=100) will then be about 8.6 parts in Mix B. In such a product, including the water formed by saponification, and the water originally in the KOH solution, there will be about 8.9 parts of water, and about 1.1 parts of soap. The stable emulsion concentrates of the invention will therefore generally consist essentially of a discontinuous phase of not more than about 9 parts by weight of water and a continuous phase of from about 90 to about 95 parts by weight of water-immiscible liquid antioxidant, and the emulsifier content will be from about 8 to about 1.1 parts of the fatty acid water-soluble soap.

The invention will be further illustrated by the following examples.

EXAMPLES 1–20

In these examples Mix A was prepared by blending together a soap-forming base and a water-immiscible liquid antioxidant in the amounts and identity given below in Table I under the heading Mix A. Mix B was prepared by blending together water (in some cases) and fatty acid in the amounts and identity given below in Table I under the heading Mix B. Mix B was then added to Mix A, generally at room temperature (about 25° C.), with high speed stirring (maximum propeller speed of 1,800–2,000 r.p.m.). The compositions of the emulsions prepared in accordance with Examples 1–20 are given in Table II.

TABLE I

| | Example Nos. | | | | | | | | | |
|---|---|---|---|---|---|---|---|---|---|---|
| | 1 | 2 | 3 | 4 | 5 | 6 | 7 | 8 | 9 | 10 |
| | Mix A (Parts by weight) | | | | | | | | | |
| Soap-Forming Base: | | | | | | | | | | |
| Potassium Hydroxide (50%) | 0.6 | 1.4 | 3.2 | 1.4 | 3.2 | 1.4 | 3.2 | | 1.4 | |
| Sodium Hydroxide (50%) | | | | | | | | | | 1.2 |
| Triethanolamine | | | | | | | | 1.2 | | |
| Antioxidant: | | | | | | | | | | |
| Agerite Spar | 95 | | | | | | | | | |
| Agerite Superlite | | 95 | | 95 | | 95 | | 95 | 95 | 95 |
| Agerite Stalite | | | 90 | | 90 | | 90 | | | |
| | Mix B (Parts by weight) | | | | | | | | | |
| Water | 3.2 | 1 | | 1.0 | | 1.0 | | 1.4 | 1.0 | |
| Fatty Acid: | | | | | | | | | | |
| Oleic Acid | 1.2 | 2.6 | 6.8 | | | | | 2.4 | | 3.8 |
| Stearic Acid (Melted) | | | | 2.6 | 6.8 | | | | | |
| Tall Oil (Acosix) | | | | | | 2.6 | 6.8 | | | |
| Neofat 42-12 | | | | | | | | | 2.6 | |
| Total | 100 | 100 | 100 | 100 | 100 | 100 | 100 | 100 | 100 | 100 |

| | Example Nos. | | | | | | | | | |
|---|---|---|---|---|---|---|---|---|---|---|
| | 11 | 12 | 13 | 14 | 15 | 16 | 17 | 18 | 19 | 20 |
| | Mix A (Parts by weight) | | | | | | | | | |
| Soap-Forming Base: | | | | | | | | | | |
| Potassium Hydroxide (50%) | | | | 0.6 | 1.4 | 1.4 | 1.4 | 3.2 | 3.2 | 3.2 |
| Ammonia (28%) | 0.7 | | | | | | | | | |
| Dimethylamine (40%) | | 3.7 | 1.25 | | | | | | | |
| Antioxidant: | | | | | | | | | | |
| Agerite Spar | | | | 95 | | | | | | |
| Agerite Superlite | 95 | | | | | | | | | |
| Agerite Stalite | | 90 | | | | | | | | |
| Agerite Superflex | | | | | | | | | | 90 |
| Cyanox LF | | | 95 | | | | | | | |
| Wing Stay T | | | | | 95 | | | | | |
| Styphen I | | | | | | 95 | | | | |
| Naugawhite | | | | | | | 95 | | | |
| Santowhite L | | | | | | | | 90 | | |
| Pennox A | | | | | | | | | 90 | |
| | Mix B (Parts by weight) | | | | | | | | | |
| Water | 1.3 | | 2.25 | 3.2 | 1 | 1 | 1 | | | |
| Fatty Acid, Oleic Acid | 3 | 6.3 | 1.5 | 1.2 | 2.6 | 2.6 | 2.6 | 6.8 | 6.8 | 6.8 |
| Total | 100 | 100 | 100 | 100 | 100 | 100 | 100 | 100 | 100 | 100 |

TABLE II

| Example Nos. | 1 | 2 | 3 | 4 | 5 | 6 | 7 | 8 | 9 | 10 |
|---|---|---|---|---|---|---|---|---|---|---|
| Soap: | | | | | | | | | | |
| Potassium Oleate | 1.37 | 2.96 | 7.75 | | | | | | | |
| Free KOH [1] | 0.06 | 0.18 | 0.24 | | | | | | | |
| Sodium Oleate | | | | | | | | | | 4.08 |
| Free NaOH [1] | | | | | | | | | | 0.06 |
| Triethanolamine Oleate [2] | | | | | | | | | 3.60 | |
| Potassium Stearate | | | | 2.96 | 7.75 | | | | | |
| Free KOH [1] | | | | 0.18 | 0.24 | | | | | |
| Potassium Tallate | | | | | | 2.95 | 7.70 | | | |
| Free KOH [1] | | | | | | 0.20 | 0.31 | | | |
| Potassium Neofat 42–12 | | | | | | | | 2.95 | | |
| Free KOH [1] | | | | | | | | 0.20 | | |
| Antioxidant: | | | | | | | | | | |
| Agerite Spar | 95 | | | | | | | | | |
| Agerite Superlite | | 95 | | 95 | | 95 | | 95 | 95 | 95 |
| Agerite Stalite | | | 90 | | 90 | | 90 | | | |
| Water | 3.57 | 1.86 | 2.01 | 1.86 | 2.01 | 1.85 | 1.99 | 1.40 | 1.85 | 0.86 |

| Example Nos. | 11 | 12 | 13 | 14 | 15 | 16 | 17 | 18 | 19 | 20 |
|---|---|---|---|---|---|---|---|---|---|---|
| Soap: | | | | | | | | | | |
| Potassium Oleate | | | | 1.37 | 2.96 | 2.96 | 2.96 | 7.75 | 7.75 | 7.75 |
| Free KOH [1] | | | | 0.06 | 0.18 | 0.18 | 0.18 | 0.24 | 0.24 | 0.24 |
| Ammonium Oleate | 3.18 | | | | | | | | | |
| Ammonia [1] | 0.01 | | | | | | | | | |
| Dimethylamine Oleate | | 7.31 | 1.74 | | | | | | | |
| Free Dimethylamine [1] | | 0.47 | 0.26 | | | | | | | |
| Antioxidant: | | | | | | | | | | |
| Agerite Spar | | | | 95 | | | | | | |
| Agerite Superlite | 95 | | | | | | | | | |
| Agerite Stalite | | 90 | | | | | | | | |
| Agerite Superflex | | | | | | | | | | 90 |
| Cyanox LF | | | | | 95 | | | | | |
| Wing Stay T | | | | | | 95 | | | | |
| Styphen I | | | | | | | 95 | | | |
| Naugawhite | | | | | | | | 95 | | |
| Santowhite L | | | | | | | | | 90 | |
| Pennox A | | | | | | | | | 90 | |
| Water | 1.81 | 2.22 | 3.00 | 3.57 | 1.86 | 1.86 | 1.86 | 2.01 | 2.01 | 2.01 |

[1] Calculated on the dry basis.
[2] No free amine; reactants mixed in stoichiometric proportions.

The resulting products in Table I and Table II above were water-in-oil emulsion concentrates containing 90% or 95% active material (antioxidant). These emulsions concentrates were remarkably stable and did not break or de-emulsify even when subjected to a freeze-thaw cycle.

From the data in Tables I and II it will be observed that the stable emulsion concentrates described therein consist essentially of a discontinuous phase of not more than about 3.6 parts by weight of water and a continuous phase of from about 90 to about 95 parts by weight of antioxidant, and as an emulsifier from about 7.8 to about 1.4 parts of soap.

In the case of the concentrate in which the liquid antioxidant is a mixture of mono-, di-, and tri-styrenated phenols (Agerite Spar) and the emulsifier is potassium oleate, the discontinuous phase contains about 3.6 parts water and the continuous phase contains about 95 parts antioxidant and the amount of emulsifier is about 1.4 parts.

In the case of the concentrate in which the antioxidant is a mixture of polybutylated p,p'-isopropylidenediphenol (Agerite Superlite) and potassium oleate as emulsifier, the discontinuous phase contains about two parts water and the continuous phase about 95 parts antioxidant, with about 3 parts potassium oleate.

For the emulsion concentrate in which the antioxidant is octylated diphenylamines and the emulsifier is potassium oleate, the discontinuous phase contains about 2 parts water and the continuous phase about 90 parts antioxidant, with about 8 parts potassium oleate.

In the case of the concentrate containing diphenylamine-acetone reaction product as antioxidant (Agerite Superflex) the discontinuous phase contains about 2 parts water and the continuous phase about 90 parts antioxidant, with about 8 parts potassium oleate.

These emulsion concentrates were used as antioxidants in latex rubber compounding by adding 31.5 parts by weight of water to 68.5 parts by weight of the 95% active emulsion concentrates, or by adding 27.8 parts by weight of water to 72.2 parts by weight of the 90% active emulsion concentrates, at room temperature (about 25° C.) in four equal increments and stirring rapidly (maximum propeller speed of 1,800–2,000 r.p.m.) for 5 minutes after each increment. The resulting 65% active oil-in-water emulsions formed by this dilution with water and inversion were stable and performed satisfactorily as antioxidants in a latex rubber formulation.

When the fatty acid and the soap-forming base were transposed in Examples 1.20, i.e., the fatty acid was placed in Mix A and the soap-forming base was placed in Mix B, the resulting concentrates produced aqueous emulsion which were of inferior quality and less stable than those produced by the emulsions of Examples 1–20.

It is not feasible to reverse the order of addition of Mix A and Mix B because of the wide difference in their respective volumes. Good mixing is not obtained when a large volume is added to a very small volume, and Mix A contains from about 93 to about 96 volumes compared with Mix B which contains from about 7 to about 4 volumes.

The above illustrative examples clearly demonstrate that the invention provides water-in-oil emulsion concentrates which are highly stable and contain 90–95% active material (antioxidant). Therefore, the concentrates can be easily and inexpensively shipped, handled and stored. The emulsion concentrates are capable of self-emulsification upon dilution with water and inversion to form stable oil-in-water emulsions. The emulsion concentrates can be diluted to aqueous emulsions at room temperature and hence do not require the expenditure of heat energy in their use in latex rubber compounding.

Oil-in-water emulsions prepared from the water-in-oil emulsion concentrates are compatible with latex rubber. The emulsion concentrates do not contain diluents, and are prepared and can be diluted to aqueous emulsion form without the necessity for using expensive high shear mixers operating at a shaft speed of 3,000–14,000 r.p.m.

The water-immiscible liquid antioxidants present in the emulsion concentrates of the invention are highly viscous materials. Quite unexpectedly, however, the invention provides these high viscosity materials in stable emulsion concentrate form without the necessity for using diluents or heat energy or high shear mixers to reduce their viscosity or particle size and to impart stability to the emulsion concentrates. The stability of the emulsion concentrates is remarkable when it is considered that they are stable under a freeze-thaw cycle which would be expected to break or de-emulsify them. Also the fact that the water-in-oil emulsion concentrates can be diluted with water is surprising, since water-in-oil emulsions can normally only be diluted with oil. It will also be noted that the less polar fatty acid must be used in Mix B and the more polar soap-forming base must be used in Mix A whereas known solubilization practice and theory would require that the more polar materials (soap-forming base and water) and the less polar materials (fatty acid and the organic antioxidant) be used together.

It will be appreciated that various modifications and changes may be made in the product and process of the invention in addition to those set forth herein without departing from the spirit of the invention and accordingly the invention is to be limited only within the scope of the appended claims.

We claim:

1. A process of preparing a stable water-in-oil emulsion concentrate which is capable of self-emulsification upon dilution with water and inversion to form a stable oil-in-water emulsion without the expenditure of heat energy and without the use of a high shear mixer comprising forming a Mix B containing from about 0 to about 3.6 parts by weight of water and from about 6.8 to about 1 parts by weight of fatty acid having from 14 to 18 carbon atoms, forming a Mix A containing an approximate stoichiometric amount of a base capable of forming water-soluble soaps with said fatty acid and from about 90 to about 95 parts by weight of a water-immiscible liquid antioxidant for latex rubber, said liquid antioxidant having a viscosity up to about 10,000 centipoises at 25° C.–40° C., and adding Mix B to Mix A with high speed stirring.

2. A process of preparing a stable water-in-oil emulsion concentrate which is capable of self-emulsification upon dilution with water and inversion to form a stable oil-in-water emulsion without the expenditure of heat energy and without the use of a high shear mixer, comprising forming a Mix B containing from about 0 to about 3.6 parts by weight of water and from about 6.8 to about 1 parts by weight of fatty acid having from 14 to 18 carbon atoms, forming a Mix A containing from about 3.2 to about 0.4 parts by weight of a 50% aqueous solution of a base capable of forming water-soluble soaps with said fatty acids and from about 90 to about 95 parts by weight of a water-immiscible liquid antioxidant for latex rubber, said liquid antioxidant having a viscosity up to about 10,000 centipoises at 25° C.–40° C., and adding Mix B to Mix A with high speed stirring.

3. A process of preparing a stable water-in-oil emulsion concentrate which is capable of self-emulsification upon dilution with water and inversion to form a stable oil-in-water emulsion without the expenditure of heat energy and without the use of a high shear mixer, as described in claim 2, wherein said fatty acid is oleic acid, and said base is potassium hydroxide.

4. A process of preparing a stable water-in-oil emulsion concentrate which is capable of self-emulsification upon dilution with water and inversion to form a stable oil-in-water emulsion without the expenditure of heat energy and without the use of a high shear mixer, as described in claim 2, wherein said Mix B contains about 3.2 parts by weight of water and about 1.2 parts by weight of oleic acid, said Mix A contains about 0.6 parts by weight of a 50% aqueous potassium hydroxide solution and about 95 parts by weight of a water-immiscible liquid antioxidant for latex rubber, and said liquid antioxidant is a mixture of mono-, di-, and tri-styrenated phenols.

5. A process of preparing a stable water-in-oil emulsion concentrate which is capable of self-emulsification upon dilution with water and inversion to form a stable oil-in-water emulsion without the expenditure of heat energy and without the use of a high shear mixer, as described in claim 2, wherein said Mix B contains about 1 part by weight of water and about 2.6 parts by weight of oleic acid, said Mix A contains about 1.4 parts by weight of a 50% aqueous potassium hydroxide solution and about 95 parts by weight of a water-immiscible liquid antioxidant for latex rubber, and said liquid antioxidant is a mixture of polybutylated p,p'-isopropylidenediphenol.

6. A process of preparing a stable water-in-oil emulsion concentrate which is capable of self-emulsification upon dilution with water and inversion to form a stable oil-in-water emulsion without the expenditure of heat energy and without the use of a high shear mixer, as described in claim 2, wherein said Mix B contains about 6.8 parts by weight of oleic acid, said Mix A contains about 3.2 parts by weight of a 50% aqueous potassium hydroxide solution and about 90 parts by weight of a water-immiscible liquid antioxidant for latex rubber, and said liquid antioxidant is a mixture of octylated diphenylamines.

7. A process of preparing a stable water-in-oil emulsion concentrate which is capable of self-emulsification upon dilution with water and inversion to form a stable oil-in-water emulsion without the expenditure of heat energy and without the use of a high shear mixer, as described in claim 2, wherein said Mix B contains about 6.8 parts by weight of oleic acid, said Mix A contains about 3.2 parts by weight of a 50% aqueous potassium hydroxide solution and about 90 parts by weight of a water-immiscible liquid antioxidant for latex rubber, and said liquid antioxidant is a diphenylamine-acetone reaction product.

8. A process of preparing a stable water-in-oil emulsion concentrate which is capable of self-emulsification upon dilution with water and inversion to form a stable oil-in-water emulsion without the expenditure of heat energy and without the use of a high shear mixer, comprising forming a Mix B containing from about 0 to about 8.6 parts by weight of water and from about 6.8 to about 1 parts by weight of fatty acid having from 14 to 18 carbon atoms, forming a Mix A containing an approximate stoichiometric amount of a base in aqueous solution capable of forming water-soluble soaps with said fatty acid and from about 90 to about 95 parts by weight of a water-immiscible liquid antioxidant for latex rubber, said liquid antioxidant having a viscosity up to about 10,000 centipoises at 25° C.–40° C., and adding Mix B to Mix A with high speed stirring.

9. The process as described in claim 8, wherein said antioxidant is a mixture of mono-, di- and tri-styrenated phenols.

10. The process as described in claim 8, wherein said antioxidant is a mixture of polybutylated p,p'-isopropylidenediphenol.

11. The process as described in claim 8, wherein said antioxidant is a mixture of octylated diphenylamines.

12. The process as described in claim 8, wherein said antioxidant is a diphenylamine-acetone reaction product.

13. A stable emulsion concentrate consisting essentially of a discontinuous phase of not more than about 3.6 parts by weight of water and a continuous phase of from about 90 to about 95 parts by weight of a water-immiscible liquid antioxidant for latex rubber, said liquid antioxidant having a viscosity of up to about 10,000 centipoises at 25° C.–40° C. and as an emulsifier from about 7.8 to about 1.4 parts of a fatty acid water soluble soap, said fatty acid having from 14 to 18 carbon atoms.

14. A stable emulsion concentrate as described in claim 13, wherein said discontinuous phase contains about 3.6 parts by weight of water and said continuous phase about 95 parts by weight of a water-immiscible liquid antioxidant for latex rubber, said liquid antioxidant being a mixture of mono-, di-, and tri-styrenated phenols and said emulsifier is about 1.4 parts by weight of potassium oleate.

15. A stable emulsion concentrate as described in claim 13, wherein said discontinuous phase contains about 2 parts by weight of water and said continuous phase about 95 parts by weight of a water-immiscible liquid antioxidant for latex rubber, said liquid antioxidant being a mixture of polybutylated p,p′-isopropylidenediphenol and said emulsifier is about 3 parts by weight of potassium oleate.

16. A stable emulsion concentrate as described in claim 13, wherein said discontinuous phase contains about 2 parts by weight of water and said continuous phase about 90 parts by weight of a water-immiscible liquid antioxidant for latex rubber, said liquid antioxidant being a mixture of octylated diphenylamines and said emulsifier is about 8 parts by weight of potassium oleate.

17. A stable emulsion concentrate as described in claim 13, wherein said discontinuous phase contains about 2 parts by weight of water and said continuous phase about 90 parts of a water-immisicble liquid antioxidant for latex rubber, said liquid antioxidant being diphenylamine-acetone reaction product and said emulsifier is about 8 parts by weight of potassium oleate.

18. A stable emulsion concentrate consisting essentially of a discontinuous phase of not more than about 9 parts by weight of water and a continuous phase of from about 90 to about 95 parts by weight of a water-immiscible liquid antioxidant for latex rubber, said liquid antioxidant having a viscosity of up to about 10,000 centipoises at 25° C.– 40° C., and as an emulsifier from about 8 to about 1.1 parts of a fatty acid water-soluble soap, said fatty acid having from 14 to 18 carbon atoms.

19. An emulsion concentrate as described in claim 18 in which said antioxidant is a mixture of mono-, di- and tri-styrenated phenols.

20. An emulsion concentrate as described in claim 18 in which said antioxidant is a mixture of polybutylated p,p′-isopropylidenediphenol.

21. An emulsion concentrate as described in claim 18 in which said antioxidant is a mixture of octylated diphenylamines.

22. An emulsion concentrate as described in claim 18 in which said antioxidant is diphenylamine-acetone reaction product.

References Cited
UNITED STATES PATENTS

| | | | |
|---|---|---|---|
| 2,840,539 | 6/1958 | Fordham | 252—401 |
| 2,877,189 | 3/1959 | Olin | 252—401 |
| 3,000,852 | 9/1961 | Merz | 252—401 XR |
| 3,032,520 | 5/1962 | Shaw | 252—401 XR |
| 3,035,015 | 5/1962 | Spacht | 252—404 XR |

LEON D. ROSDOL, *Primary Examiner.*

M. WEINBLATT, *Examiner.*